United States Patent
Wong et al.

(10) Patent No.: US 8,435,000 B2
(45) Date of Patent: May 7, 2013

(54) VARIABLE VANE ACTUATION SYSTEM

(75) Inventors: Albert Wong, Fishers, IN (US); Lucas Perez, Indianapolis, IN (US); Anthony F. Tommasone, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1032 days.

(21) Appl. No.: 12/044,367

(22) Filed: Mar. 7, 2008

(65) Prior Publication Data

US 2009/0226305 A1 Sep. 10, 2009

(51) Int. Cl.
*F01D 17/16* (2006.01)

(52) U.S. Cl.
USPC .......................... 415/161; 415/160; 415/162

(58) Field of Classification Search .................. 415/148, 415/155, 159–162
See application file for complete search history.

(56) References Cited

U.S. PATENT DOCUMENTS

| | | | |
|---|---|---|---|
| 2,858,062 A | 10/1958 | Allen | |
| 2,929,546 A * | 3/1960 | Wilkes, Jr. | 415/37 |
| 2,933,234 A | 4/1960 | Neumann | |
| 2,933,235 A | 4/1960 | Neumann | |
| 3,487,992 A | 1/1970 | Pineda | |
| 3,779,665 A | 12/1973 | Tatem, Jr. et al. | |
| 3,873,230 A | 3/1975 | Norris et al. | |
| 3,904,309 A * | 9/1975 | Keetley | 415/148 |
| 4,003,675 A * | 1/1977 | Stevens et al. | 415/150 |
| 4,049,360 A | 9/1977 | Snell | |
| 4,130,375 A * | 12/1978 | Korta | 415/161 |
| 4,295,784 A | 10/1981 | Manning | |
| 4,373,859 A * | 2/1983 | Thebert | 415/159 |
| 4,409,788 A | 10/1983 | Nash et al. | |
| 4,430,043 A * | 2/1984 | Knight et al. | 415/159 |
| 4,492,520 A | 1/1985 | Marchand | |
| 4,720,237 A | 1/1988 | Weiner et al. | |
| 4,755,104 A | 7/1988 | Castro et al. | |
| 4,884,944 A * | 12/1989 | Tate | 415/156 |
| 4,890,977 A * | 1/1990 | Tremaine et al. | 415/164 |
| 5,228,828 A | 7/1993 | Damlis et al. | |
| 5,549,448 A | 8/1996 | Langston | |
| 6,174,130 B1 | 1/2001 | King et al. | |
| 6,179,469 B1 * | 1/2001 | Ichiryu et al. | 384/96 |
| 6,551,057 B1 | 4/2003 | Haaser et al. | |
| 6,769,868 B2 | 8/2004 | Harrold | |
| 6,821,084 B2 | 11/2004 | Bathori et al. | |
| 6,948,910 B2 | 9/2005 | Polacsek | |

* cited by examiner

*Primary Examiner* — Edward Look
*Assistant Examiner* — Liam McDowell
(74) *Attorney, Agent, or Firm* — Krieg DeVault LLP

(57) ABSTRACT

A variable vane actuation system is disclosed herein. The variable vane actuation system includes a ring member disposed for pivoting movement about a centerline axis. The ring member is engaged with a plurality of vanes in a turbine engine such that the plurality of vanes pivot in response to the pivoting movement of the ring member. The variable vane actuation system also includes a ring moving device engaged with the ring member at first and second positions spaced from one another about the centerline axis. The ring moving device is operable to apply first and second forces, respectively, at the first and second positions to pivot the ring member.

20 Claims, 2 Drawing Sheets

VARIABLE VANE ACTUATION SYSTEM

BACKGROUND OF THE INVENTION

1. Field of the Invention

The invention relates to a system for moving variable stator vanes, such as in a turbine engine for example.

2. Description of Related Prior Art

Variable pitch stator vanes can be used in the compressor sections of gas turbine engines. These vanes can be pivotally mounted inside a compressor case of the turbine engine and can be arranged in circumferential rows that are spaced from one another along a centerline axis of the turbine engine. Each row corresponds to a different stage of the compressor section. Generally, each of the individual vanes can pivot on a spindle about an axis that extends transverse to the centerline axis. Engine performance and reliability can be enhanced by varying the angle of the vanes at different stages during the operation of the turbine engine. For example, in a turbine engine applied to aircraft propulsion, obtaining greater thrust can require the compressor section to impart a higher pressure ratio to the fluid moving through the compressor. However, on the other hand, a higher pressure ratio can cause the compressor to stall or surge. Variable pitch stator vanes can be pivoted as the speed of the engine changes to ensure that each vane is in a position to guide the flow angle as a function of rotor speed to counteract the development of stall characteristics.

SUMMARY OF THE INVENTION

In summary, the invention is a variable vane actuation system. The variable vane actuation system includes a ring member disposed for pivoting movement about a centerline axis. The ring member is engaged with a plurality of vanes, such as in a turbine engine. The plurality of vanes pivot in response to the pivoting movement of the ring member. The variable vane actuation system also includes a ring moving device engaged with the ring member at first and second positions spaced from one another about the centerline axis. The ring moving device is operable to apply first and second forces, respectively, at the first and second positions to pivot the ring member.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

The exemplary embodiment of the invention provides a variable vane actuation system for pivoting one or more vanes in a compressor of a turbine engine. Alternative embodiments of the invention can be practiced to pivot vanes in different operating environments. The exemplary embodiment of the invention has been found to provide several benefits and these benefits are set forth below. However, it is noted that the benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiment and described herein are not limitations of the broader invention, but rather demonstrate industrial applicability.

Figure 1:
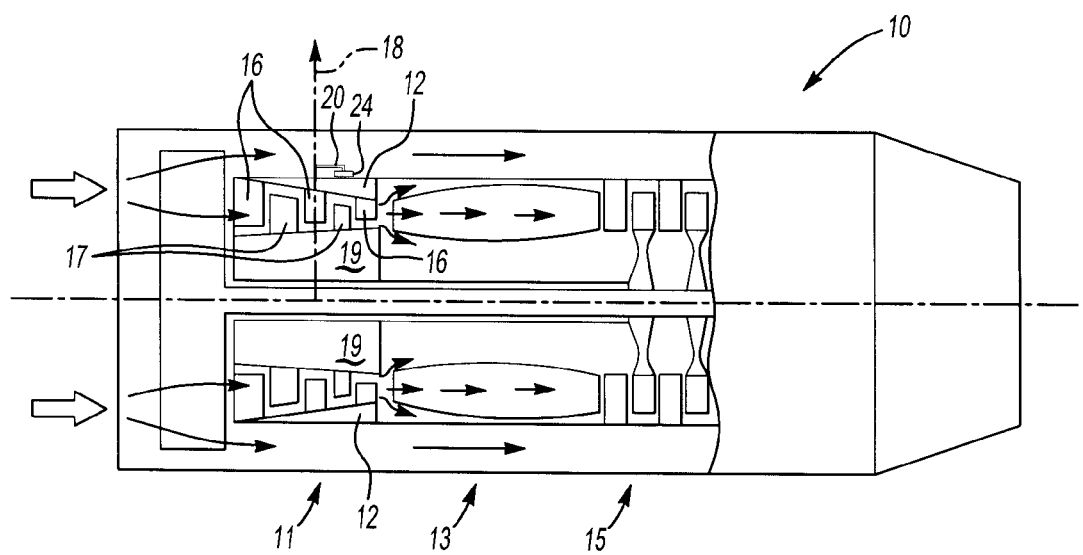
FIG. 1 is a schematic cross-section of a turbine engine according to the exemplary embodiment of the invention.

FIG. 1 schematically shows a turbine engine 10 according to the exemplary embodiment of the invention. The turbine engine 10 includes a compressor section 11, a combustor section 13, and a turbine section 15. A rotor of the turbine engine 10 extends along a centerline axis 14 and the sections 11, 13, 15 are disposed along the axis 14. The centerline axis 14 can be the central axis of the turbine engine 10.

A compressor casing 12 can enclose a portion of compressor section 11. The compressor section 11 can include a plurality of rotatable compressor blades 17 mounted on a hub 19. The compressor section 11 can also include a plurality of static vanes 16. The vanes 16 and blades 17 can be arranged in alternating circumferential rows. For example, a first circumferential row can include a plurality of vanes 16 encircling the axis 14. A second circumferential row can be spaced from the first circumferential row along the axis 14 and include a plurality of blades 17 encircling the axis 14.

Each of the vanes 16 can be pivoted about an axis 18 extending radially or substantially radially relative to the axis 14. The vanes 16 can be supported by the compressor casing 12 for pivoting movement. Each vane 16 can be coupled to a vane link, such as vane link 20. Each vane link 20 can extend between a first end engaged with the vane 16 and a second end spaced from the first end.

Figure 2:
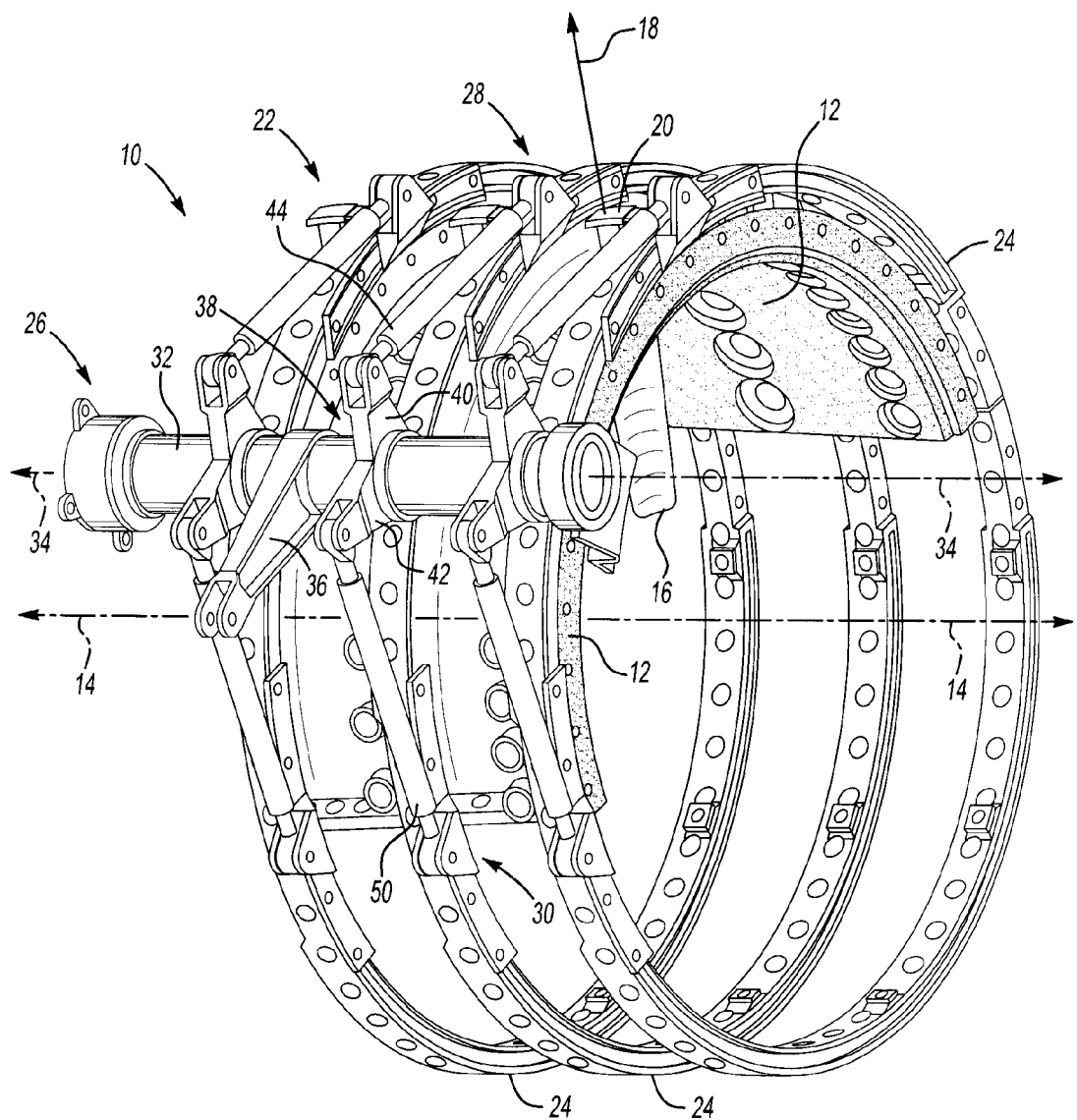
FIG. 2 is a perspective view of components of a turbine engine relevant to the exemplary embodiment of the invention.

Referring now to FIG. 2, the exemplary embodiment of the invention includes an actuation system 22 for the variable vanes 16. The variable vane actuation system 22 can move all of the vanes 16 concurrently or less than all of the vanes 16. In the exemplary embodiment of the invention, the variable vane actuation system 22 includes a ring member 24 and a ring moving device 26. The ring member 24 is shown schematically in FIG. 1.

Returning to FIG. 2, the ring member 24 can be operable to pivot about the centerline axis 14. The ring member can be engaged with each of the second ends of the plurality of vane links 20. As a result, pivoting movement of the ring member 24 about the centerline axis 14 is transmitted through the plurality of vane links 20 to pivotally move each of the plurality of vanes 16. The exemplary ring member 24 extends 360 degrees about the centerline axis 14, however the ring member 24 can extend less than 360 degrees in alternative embodiments of the invention.

The ring moving device 26 is engaged with the ring member 24 at first and second mounting positions 28, 30 circumferentially spaced from one another about the centerline axis 14. In the exemplary embodiment of the invention, the first and second mounting 28, 30 positions on the ring 24 can be 90 degrees apart relative to the centerline axis 14. However, in alternative embodiments of the invention, the first and second mounting 28, 30 positions on the ring 24 can be spaced from one another at an angle different than 90 degrees.

The ring moving device 26 is operable to concurrently apply first and second forces at the first and second mounting locations 28, 30, respectively, to pivot the ring member 24 and thereby pivot the plurality of vanes 16. The exemplary ring moving device 26 can include a torque tube 32 operable to rotate or pivot about a tube axis 34. The tube axis 34 can be parallel to and spaced from the centerline axis 14. The exemplary torque tube 32 can be rotated or pivoted by any form of force-transmitting device (not shown). The force-transmitting device (not shown) can act on an arm 36 fixed to the torque tube 32.

In the exemplary embodiment of the invention, a clevis 38 can be mounted on the torque tube 32 and have first and second arms 40, 42 projecting radially outward from the tube axis 34. The first and second arms 40, 42 of the clevis 38 can be the same length or can be different lengths. The first and second arms 40, 42 of the clevis 38 can be 90 degrees apart about the tube axis 32 and be substantially coplanar. In alternative embodiments of the invention, the first and second arms 40, 42 of the clevis 38 can be spaced from one another at an angle different than 90 degrees and/or can be disposed in different planes.

The tube axis 34 can be positioned between the first and second positions 28, 30 about the centerline axis 14. The tube axis 34 does not move relative to the centerline axis 14 in the exemplary embodiment of the invention. Therefore, the relationship between the tube axis 34 and the centerline axis 14 can be defined such that a plane containing both of the tube axis 34 and the centerline axis 14 is disposed between the first and second mounting positions 28, 30 throughout all or at least part of the pivoting movement of the ring member 24.

Figure 3:
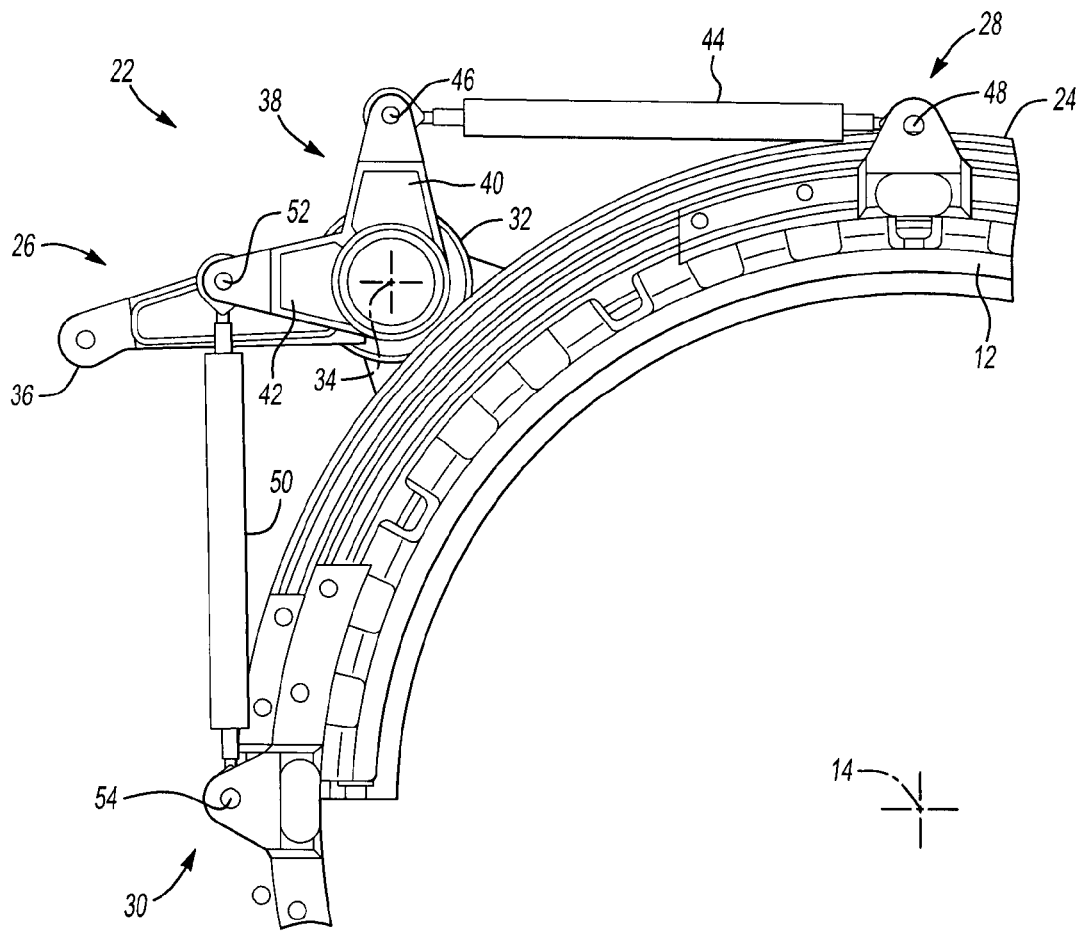
FIG. 3 is a partial front view of the components shown in FIG. 2.

Referring to FIG. 3, a first link 44 can extend between the first arm 40 of the clevis 38 and the first mounting position 28 on the ring member 24. The first link 44 can be engaged with the first arm 40 for pivoting movement about an axis 46. The first link 44 can be engaged with ring member 24 for pivoting movement about an axis 48. A second link 50 can extend between the second arm 42 of the clevis 38 and the second mounting position 30 on the ring member 24. The second link 50 can be engaged with the second arm 42 for pivoting movement about an axis 52. The second link 50 can be engaged with ring member 24 for pivoting movement about an axis 54. The first and second links 44, 50 can be the same length or can be different lengths.

In the operation of the exemplary embodiment of the invention, the torque tube 32 can be rotated about the tube axis 34, such as clockwise relative to the perspective of FIG. 3. During such movement, the first force can be transmitted to the ring member 24 through the first link 44 and the second force can be transmitted to the ring member 24 through the second link 50. The first link 44 can push the first mounting position 28 of the ring member 24 with the first force and the second link 50 can pull the second mounting position 30 of the ring member 24 with the second force.

The exemplary embodiment of the invention can reduce the friction loads experience by the ring member 24. For example, the application of separate forces at two different locations can reduce binding between the ring member 24 and the compressor casing 12, or between the ring member 24 and any other structure that supports or guides the ring member 24 during movement of the ring member 24. The exemplary embodiment of the invention can also reduce ring deflection. Deflection can arise when binding occurs and, as set forth above, the exemplary embodiment of the invention can reduce binding. The exemplary embodiment of the invention can also more accurately position the one or more vanes. The ring member 24 is not designed to deflect and so the effect of ring deflection on vane positioning is unpredictable. The reduction of deflection, or the decreased likelihood of deflection, can increase the predictability and accuracy of vane positioning.

The kinematic relationships among the structures of the exemplary embodiment of the invention can result in the ring moving device 26 applying equal first and second forces through the first and second links 44, 50, respectively. The first and second forces applied through the first and second links 44, 50 can each include a component tangential to the ring member 24. Each of the tangential components of the first and second forces can be equal to one another throughout all or at least part of the pivoting movement of the ring member 24.

Example 1

Many different kinematic relationships can be applied for practicing the broad invention. In one example for practicing the exemplary embodiment of the broader invention, the distance between the centerline axis 14 and the torque tube axis 34 can be 272.5 mm. The distance between the centerline axis 14 and the axis 48 (point of engagement between the first link 44 and the first mounting position 28 of the ring member 24) can be 256.6 mm. The distance between the centerline axis 14 and the axis 54 (point of engagement between the second link 50 and the second mounting position 30 of the ring member 24) can also be 256.6 mm. The distance between the tube axis 34 and the axis 46 (point of engagement between the first link 44 and the arm 40 of the clevis 38) can be 60.15 mm. The distance between the tube axis 34 and the axis 52 (point of engagement between the second link 50 and the arm 42 of the clevis 38) can also be 60.15 mm. The length of the first link 44 (the distance between the axes 46, 48) can be 105.40 mm. The length of the second link 50 (the distance between the axes 52, 54) can also be 105.40 mm. The torque tube 32 can be pivoted about 20 degrees around the centerline axis 14 between two end limits of rotational travel for pivoting the vanes 16. As a result of dimensions set forth in this example, the first and second links 44, 50 can be substantially tangent to the ring member 24 throughout movement of the ring member 24.

The dimensions provided by the example set forth above are for illustration only and are not limiting to the invention. The dimensions provided herein can be helpful when considered relative to one another. The example may be considered a relatively small embodiment. In a relatively large embodiment of the invention, one or more of the dimensions provided herein may be multiplied by common multiplier if desired. Alternatively, different operating environments may dictate different relative dimensions.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A variable vane actuation system comprising:
   a ring member disposed for pivoting movement about a centerline axis and operably connected with at least one vane such that said at least one vane pivots in response to the pivoting movement of said ring member;
   a ring moving device engaged with said ring member at first and second positions spaced from one another about said centerline axis and operable to apply first and sec- ond forces, respectively, at said first and second positions to move said ring member, the ring moving device including:
  a torque tube rotatable about a tube axis;
  a clevis mounted on said torque tube to rotate about the tube axis and having first and second arms projecting outward from the clevis, the first and second arms configured to interact with the ring member and transmit the first and second forces;
  wherein a torque useful to change orientation of the torque tube and thus orientation of the ring member is received by the torque tube other than through a torque produced via the first and second forces; and
  rotational movement of the torque tube in one direction produces rotational movement in the one direction in the ring member at both said first and second positions.

2. The variable vane actuation system of claim 1 wherein each of said first and second forces includes a component tangential to said ring member and wherein said tangential components of said first and second forces are equal to one another throughout at least part of said pivoting movement of said ring member.

3. The variable vane actuation system of claim 2 wherein said tangential components of said first and second components are equal to one another throughout all of said pivoting movement of said ring member.

4. The variable vane actuation system of claim 1 wherein said ring moving device further comprises:
  a first link extending between said first arm of said clevis and said first position on said ring member; and
  a second link extending between said second arm of said clevis and said second position on said ring member.

5. The variable vane actuation system of claim 4 wherein said first and second arms of said clevis are further defined as being 90 degrees apart about said tube axis and are substantially coplanar.

6. The variable vane actuation system of claim 4 wherein a plane containing both of said tube axis and said centerline axis is disposed between said first and second positions throughout all of said movement of said ring member.

7. The variable vane actuation system of claim 4 wherein said first and second links are further defined as being the same length.

8. The variable vane actuation system of claim 4 wherein said first and second arms of said clevis are further defined as being the same length.

9. The variable vane actuation system of claim 1 wherein said first and second positions are further defined as being 90 degrees apart relative to said centerline axis.

10. A method for pivoting vanes comprising the steps of:
  pivoting a plurality of vanes concurrently with a ring member by pivoting the ring member about a centerline axis;
  applying first and second forces to the ring member at first and second positions spaced from one another about a periphery of the ring member to pivot the ring member;
  wherein said applying step includes the steps of:
    linking the ring member with a torque tube having a clevis through first and second links, the first and second links connected to the clevis and to the ring member;
    receiving a torque into the torque tube from a location that does not include the first and second links;
    as a result of the receiving, rotating the torque tube whereby the first force is transmitted from the torque tube through the first link and the second force is transmitted from the torque tube through the second link, the rotating the torque tube producing rotations in the same direction in the ring member at the first position and at the second position.

11. The method of claim 10 wherein said applying step is further defined as applying equal forces concurrently at the first and second positions.

12. The method of claim 10 wherein said applying step includes the steps of:
  pushing the first position of the ring member with the first force; and pulling the second position of the ring member with the second force.

13. The method of claim 10 further comprising the step of: forming the first and second links to be the same length.

14. The method of claim 10 wherein said applying step includes the step of:
  applying equal tangential forces to the ring member.

15. A turbine engine comprising:
  a compressor casing extending along a centerline axis;
  a plurality of vanes supported in said compressor casing for pivoting movement about individual axes, each of said individual axes being transverse to said centerline axis;
  a plurality of vane links each having a first end operably connected with one of said plurality of vanes and a second end spaced from said first end;
  a ring member operable to pivot about said centerline axis and operably connected with each of said second ends of said plurality of vane links such that movement of said ring member about said centerline axis is transmitted through said plurality of vane links to move each of said plurality of vanes;
  a ring moving device operably connected with said ring member at first and second mounting positions circumferentially spaced from one another about said centerline axis and operable to concurrently apply first and second forces at said first and second mounting locations, respectively, to move said ring member and thereby pivot said plurality of vanes;
  a torque tube disposed for rotation about a tube axis parallel to and spaced from said centerline axis and structured to receive an input torque apart from the first and second forces to manipulate the plurality of vanes;
  a clevis mounted on said torque tube and having first and second arms projecting radially outward from said tube axis;
  wherein the first and second forces acting through the ring moving device act through the first and second arms, respectively, of the clevis; and
  wherein rotation of the ring member at the first mounting position matches rotation of the ring member at the second mounting position.

16. The turbine engine of claim 15 wherein said ring member is further defined as extending 360 degrees about said centerline axis and wherein said first and second mounting locations are spaced less than 180 degrees from one another about said centerline axis.

17. The turbine engine of claim 16 wherein said first and second mounting locations are spaced at least 45 degrees from one another about said centerline axis.

18. The turbine engine of claim 15 wherein said ring moving device further comprises:
  a first link engaged to said first arm of said clevis for pivoting movement about a first pivot axis and also engaged to said first mounting position for pivoting movement about a second pivot axis; and
  a second link extending between said second arm of said clevis for pivoting movement about a third pivot axis and also engaged to said second mounting position for pivoting movement about a fourth pivot axis.

19. The turbine engine of claim 18 wherein both of said first and second links are further defined as being substantially tangent to said ring member throughout all of said pivoting movement of said ring member.

20. A variable vane actuation system comprising:
   a ring member disposed for pivoting movement about a centerline axis and operably connected with at least one vane such that said at least one vane pivots in response to the pivoting movement of said ring member, the ring member having a rigid construction;
   a ring moving device engaged via a first link and a second link with said ring member at first and second positions spaced from one another about said centerline axis and operable to apply first and second forces, respectively, at said first and second positions to move said ring member, the ring moving device including:
   a torque tube rotatable about a tube axis;
   a clevis mounted on said torque tube to rotate about the tube axis and having first and second arms projecting outward from the clevis, the first and second arms configured to interact with the ring member through the first and second links and transmit the first and second forces;
   wherein a torque useful to change orientation of the torque tube and thus orientation of the ring member is received at a location other than through the first link and second link; and
   wherein rotation of the torque tube produces like rotation in the rigid ring member.

\* \* \* \* \*